Patented June 30, 1936

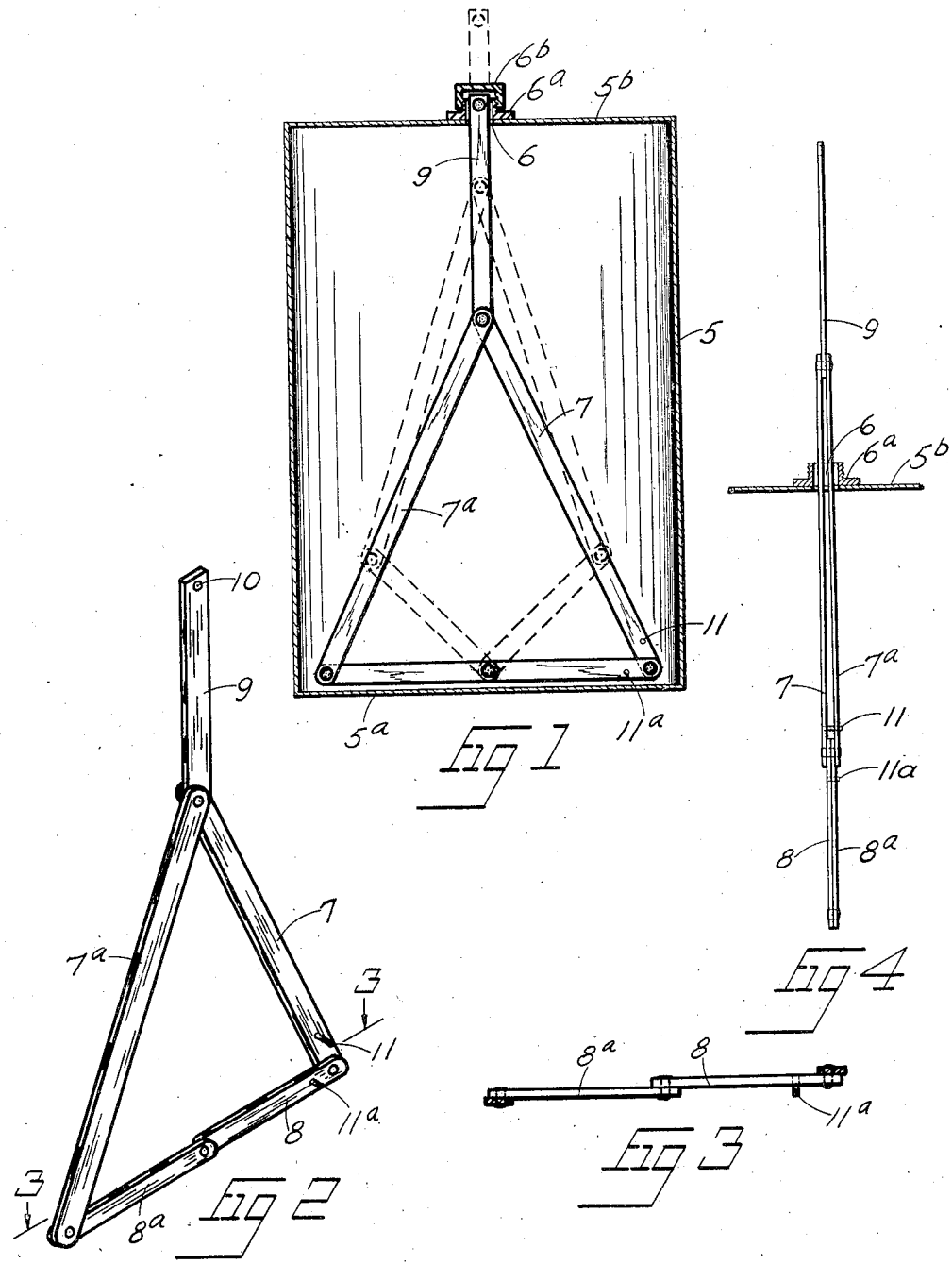

2,045,710

UNITED STATES PATENT OFFICE 2,045,710

BARREL AGITATOR

Fred H. Haywood, Cleveland, Ohio

Application April 13, 1935, Serial No. 16,220

2 Claims. (Cl. 259—134)

This invention relates to improvements in agitators for drums, barrels and like containers, and the primary object in view is to provide a device of this type which is unusually compact when folded so that it may be easily passed through the bunghole of a drum or barrel, may be installed when the container is shipped and remain installed until the paint or other solution is used without substantial interference with the normal use of the container or the solution therein, is efficient in operation and at the same time is simple in construction and low in cost of manufacture.

Another object is to provide a simple type of agitator having blades or stirring elements which will automatically extend and assume an effective stirring position when inserted in a drum, barrel or like container and will remain in such position during operation without requiring auxiliary attachments and which when removed automatically collapses into compact form.

The foregoing and other objects and advantages will become apparent in view of the following description taken in conjunction with the drawing, wherein:

Figure 1 is a view in side elevation of the improved agitator showing the same in partly extended position in dotted lines and fully extended or working position in full lines in a drum or barrel, the latter being shown in transverse vertical section;

Figure 2 is a view in perspective;

Figure 3 is a section taken on the line 3—3, Figure 2; and

Figure 4 is a view in edge elevation, showing the position the agitator assumes when removed from the drum.

The improved agitator comprises a series of side and bottom stirring blades arranged in the form of a toggle whereby when the lower end thereof contacts the bottom of the drum, barrel or like container, or the sediment therein, the bottom blades automatically open out across the bottom of the container and the side blades extend at a converging angle upwardly into the container in what I have found to be a most effective stirring position.

Referring to the drawing in detail, a drum or barrel is generally indicated at 5 and is provided with a bottom wall 5a and top wall 5b. The top wall is provided with a bunghole 6 over which is secured a sleeve 6a, the latter being provided with a sealing cap or like closure 6b.

The device consists of a series of stirring elements or blades 7, 7a and 8, 8a which are pivotally connected to one another to provide in effect a toggle arrangement. The blades 7 and 7a at their upper ends are pivotally connected to a handle bar 9 provided with a hole 10 in the upper end thereof. The blades 7 and 7a constitute side-stirring elements, and the blades 8 and 8a bottom-stirring elements, the bottom blades preferably being of such length as to extend across the bottom of the drum or barrel to a point adjacent the side walls of the latter, while the side blades are of a length which will provide the most efficient stirring action consistent with the depth of the container.

To prevent the blades which constitute the toggle from reaching dead center when the device is in folded position, stops in the form of pins 11 and 11a are secured to the side blades 7 and 8 preferably on opposite sides of the joint therebetween, it being obvious that these stop members could be attached to the opposed blades 7a and 8a to serve the same purpose. Thus when the device is raised and the blades assume the position shown in Figure 4, the stop pins contact the opposed blades, as shown in Figure 4, and prevent the blades from reaching dead center or reaching a point which would prevent the device from opening up when the ends of the bottom blades are lowered into contact with the bottom 5a of the drum or barrel.

The operation of the device should be apparent from the drawing. When it is desired to insert the agitator in a drum or barrel, the cap 6b is removed and the agitator lowered into the barrel through the bunghole 6, as shown in Figure 4. When the lower end of the agitator contacts the bottom wall 5a of the drum, the blades first open out as shown in dotted lines in Figure 1, gradually assuming the position shown in full lines, with the blades 8 and 8a extending across the bottom of the drum and the blades 7 and 7a extending at a converging angle upwardly, the stirring elements then being generally in the form of a triangle. I have found this to be a very effective stirring position. In the event the paint or other solution in the bottom of the drum is unusually thick or viscous due to sediment or the accumulation of unsoluble pigments, the blades will cut through the heavy or viscous solution and find their way by gravity to the bottom of the drum. The bar 9 is preferably of suitable lengths for enclosure within the drum so the cap 6b may be screwed down over the end thereof and the drum shipped with the agitator in place.

When it is desired to stir the contents of the drum, the cap 6b is simply removed and the bar 9 raised sufficiently to bring the hole 10 clear of the top of the sleeve 7, whereupon a bar, crank or any convenient tool may be inserted through the hole to facilitate a rotary stirring action.

The blades of the agitator may be made from bar stock or the like, and since each and every blade is substantially the same, they may be blanked from a single die, thereby materially reducing the cost of manufacture. It will also be obvious that the device is easily assembled.

It will be understood that certain minor changes in structure and design may be adopted all within the scope of the appended claims.

I claim:

1. In combination with a drum, barrel or analogous container, a device for stirring a solution in the container, comprising a pair of bottom blades and a pair of side blades, the bottom blades being pivotally connected to one another and to the contiguous ends of the side blades, and a handle bar pivotally connected to the opposite ends of the side blades, the lower ends of the bottom blades when contacting with the bottom of the container opening outwardly and together with the side blades assuming a substantially triangular formation, and one or more stop pins connected to certain of the blades to prevent the blades from reaching dead center when in folded position.

2. In combination with a barrel, a device for stirring the solution therein comprising a pair of bottom blades and a pair of side blades, the bottom blades being of equal length and pivotally connected to one another and having their outer ends pivotally connected to said side blades, a handle bar disposed intermediate and pivotally connected to the opposite ends of said side blades, the bottom blades being adapted to extend outwardly when engaged with the bottom of said barrel and being of suitable length to extend substantially across the diameter of the barrel, a stop pin on one of said bottom blades and disposed for engagement with the opposed bottom blade and a stop pin on one of the side blades adapted for engagement with the opposed side blade to prevent dead center alignment when in folded position.

FRED H. HAYWOOD.